United States Patent [19]

Schurger et al.

[11] Patent Number: 4,932,796
[45] Date of Patent: Jun. 12, 1990

[54] THRUST BEARING SEALING COLLAR ASSEMBLY

[75] Inventors: Rainer Schurger, Schwanfeld; Heinz Peter, Dittelbrunn, both of Fed. Rep. of Germany

[73] Assignee: SKF GmbH, Schweinfurt, Fed. Rep. of Germany

[21] Appl. No.: 351,961

[22] Filed: May 5, 1989

[30] Foreign Application Priority Data

May 13, 1988 [DE] Fed. Rep. of Germany ... 8806300[U]

[51] Int. Cl.⁵ ............................................. F16C 33/78
[52] U.S. Cl. ...................................... 384/607; 384/482; 384/486
[58] Field of Search ............... 384/607, 482, 486, 484, 384/140

[56] References Cited

U.S. PATENT DOCUMENTS

| | | | |
|---|---|---|---|
| 3,423,141 | 1/1969 | Pethis | 384/482 |
| 3,473,856 | 10/1969 | Helms | 384/482 |
| 4,822,183 | 4/1989 | Lederman | 384/607 |

*Primary Examiner*—Lenard A. Footland
*Attorney, Agent, or Firm*—Eugene E. Renz, Jr.

[57] ABSTRACT

Sealing device for a thrust bearing has a pair of bearing disks, including a pair of sealing collars (4, 5, 33, 34), and one of the collars being permanently seated on one of the bearing disks and the other collar being free to rotate on the other disk. The sealing collars (4, 5, 33, 34) are provided with integral sealing lips (29), which rest preferably against the facing end surfaces (30, 30a) of the bearing disks (1, 2).

5 Claims, 2 Drawing Sheets

FIG. I ial, this in the first the second seal fore collapse with this of the axially mar outer vigo, a small of a thought assembly while the outside ther means. The present also invention, provides the required air ad means on the outer from assembly including, to or seat colla not need that the disks have have bothal. the this a thrust bearing. The bearingment. The assembly be a simple improvments thrust bearings pieces. bear ing including sealing collars in the bore and on lateral ing surface permanently the bearings one assembly

THRUST BEARING SEALING COLLAR ASSEMBLY

FIELD OF THE INVENTION

The present invention relates to improvements in thrust bearings, and more specifically, to an assembly including sealing collars which are located in the bore and on the lateral surface which are permanently seated on one bearing disk of the assembly and free to rotate on the other disk.

BACKGROUND OF THE INVENTION

Thrust bearing assemblies of this general type are not new per se and one such prior bearing is shown in West German Utility Patent No. 74-06,356. In accordance with the bearing shown in this patent, bushings are located on the lateral surface and in the bore of the bearing disk and the joint lines between the bearing disks and the bushings are sealed with elastic disks which engage in annular grooves in the bearing disks and rest against the bushings. The disadvantages and drawbacks of this type of assembly is that the fact that the sealing device consists of a plurality of individual parts.

SUMMARY OF THE INVENTION

With the foregoing in mind, it is an object of the present invention to provide a thrust bearing and sealing collar assembly comprising only a comparatively few parts which is characterized by novel features of construction and arrangement providing optimum sealing characteristics. To this end, in accordance with the present invention, the sealing collars are provided with molded sealing lips which preferably rest against the opposing end surfaces of the bearing disk to prevent escape of lubricants such as oil in the bearing and able to seal the enclosed environment from intrusion of foreign particulate matter such as dirt or water from the outside.

In accordance with another feature of the invention, the bearing disks have peripheral recesses on both the lateral surfaces and in the bore. The recesses have contact surfaces against which retaining projections of the sealing collars abut to hold the bearing disks in place axially in the assembly.

In accordance with still another feature of the present invention, the sealing collars are also provided with peripheral sealing lips which rest against the surfaces of the recesses and provide additional sealing action.

In accordance with still another feature of the present invention, recesses are provided on the lateral surface of the lateral internal surfaces of the bearing disks starting from the end surfaces thereof, and in the bore which hold the sealing collars. By this construction, the bearing is a relatively compact assembly and occupies a relatively small amount of space.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
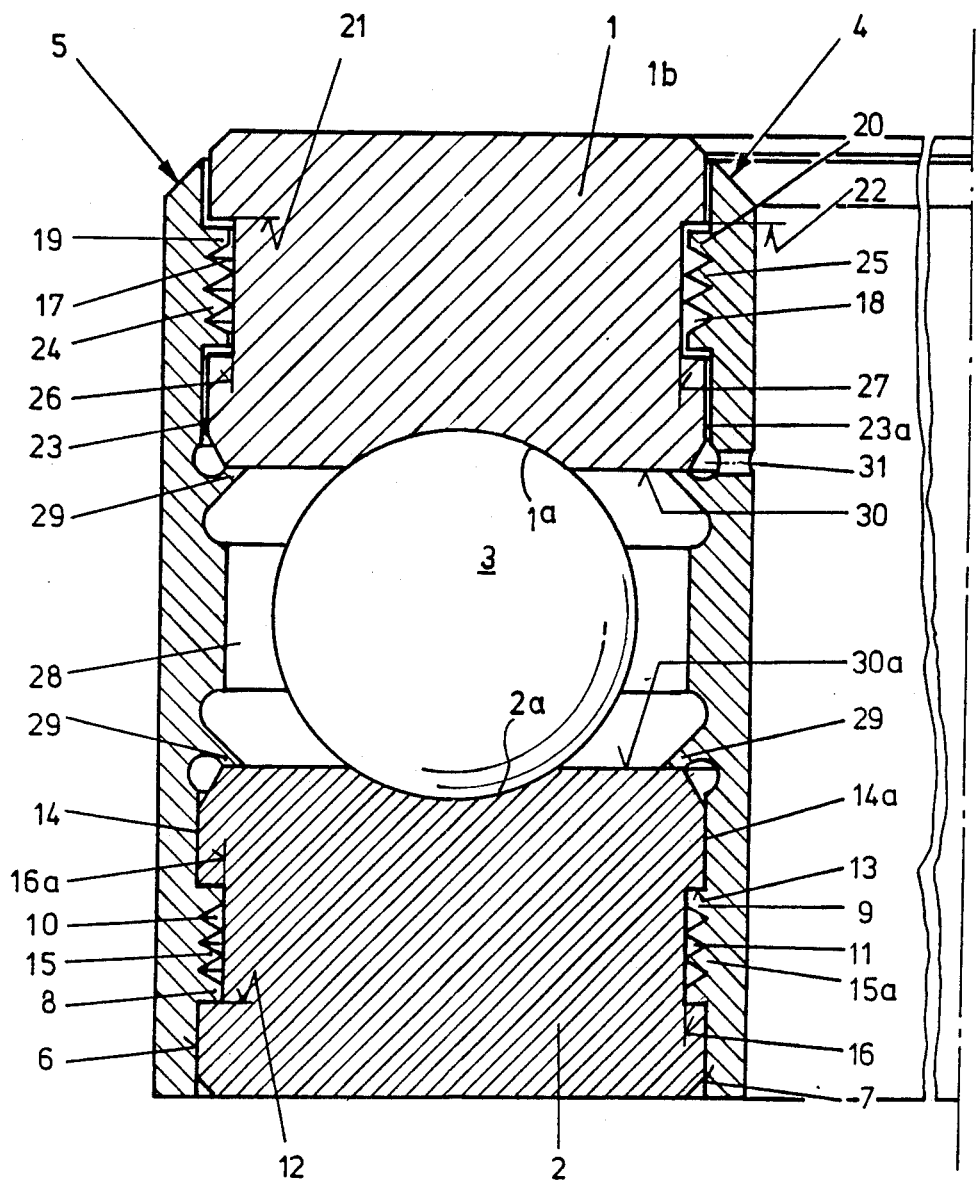
FIG. 1 is a fragmentary sectional view through a thrust ball bearing with sealing collars constructed in accordance with the present invention.

Referring now to the drawings, and particularly to FIG. 1 thereof, there is shown a deep groove thrust ball bearing comprising as illustrated, a pair of bearing disks 1 and 2, having confronting raceways 1a and 2a and a series of balls in the annular space between the bearing disks. The assembly further includes a pair of sealing collars 4 and 5, the outer sealing collar 5 circumscribing the outer peripheral surface of the bearing disks and the inner sealing collar 4 located in the bore 7 of the sealing disks. The sealing collars 4 and 5 are permanently seated on lateral surface 6 and bore surface 7, respectively of bearing disk 2 and are held in position against axial displacement by projections 8 and 9 which engage in circumferentially extending recesses 10 and 11 on the lateral surface and in the bore of bearing disk 2 and which rest against laterally extending retaining surfaces 12 and 13. Additionally, as illustrated, the joint 14 and 14a between bearing disk 2 and sealing collars 4 and 5 is sealed by a series of sealing lips 15 and 15a which engage peripheral surfaces 16 and 16a of circumferentially extending recesses 10 and 11 in the inner and outer peripheral surfaces of the bearing disk 2.

Bearing disk 1 rotates freely between collars 4 and 5. Circumferentially extending recesses 17 and 18 are formed on the inner and outer peripheral surfaces of the bearing disk spaced between the outer axial end face 1b and the inner face 30 which contains the raceway 1a for the balls. A series of radially inwardly directed projections 19 and 20 formed on the sealing collars 4 and 5 engage in the recesses 17 and 18 to retain the bearing disk axially. These projections as illustrated are confined within contact surfaces 21 and 22. The joints 23 and 23a between bearing disk 1 and inner and outer sealing collars 4 and 5 are sealed by circumferentially extending radially directed sealing lips 24 and 25 which rest against the axially extending peripheral surfaces 26 and 27 of recesses 17 and 18 formed in the bearing disk between its axial end faces. The annular space 28 between disks 1 and 2 is adapted to be filled with a lubricant such as oil. In order to retain the lubricant, sealing lips 29 are formed integrally on the inner peripheral surface of the collars 4 and 5 which engage the confronting inner axial end faces 30 and 30a of the bearing rings 1 and 2 outboard of the raceways 1a and 2a. In order to allow air to escape between the collars 4 and 5 when bearing disks 1 and 2 are inserted, one or more vent openings 31 are provided in the present instance in the wall of the inner collar 4.

Figure 2:
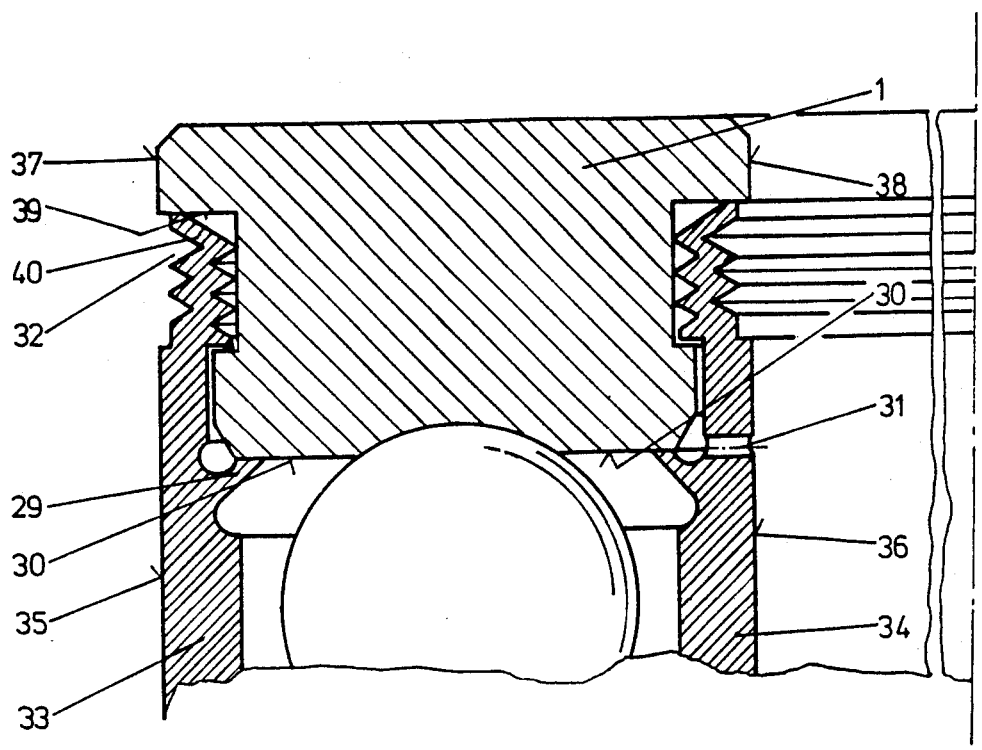
FIG. 2 is a sectional view similar to FIG. 1, showing a modified embodiment of thrust bearing according to the present invention.

FIG. 2 shows a modified embodiment of thrust bearing made in accordance with the present invention. This embodiment is generally similar to that previously described and includes the same array of collars and disks as is shown in FIG. 1, even though only the outer bearing disk 1 is shown. This embodiment differs from the previous embodiment described above in that, in this instance, the rotatable bearing disk 1 and the lower fixed bearing disk (not shown) are provided on the lateral surface 37 and in the bore 38 with peripheral recesses 32 which extend from inner axial end face 30. The inner and outer collars engage in the entire recess so that the outer peripheral surfaces 35 and 36 of the collars are generally aligned and flush with outer peripheral surfaces 37 and 38 of the disks. Additionally, the peripheral sealing lips 40 in this instance, rest against radially oriented sealing surfaces 39 of peripheral recess 32.

While particular embodiments of the present invention have been illustrated and described herein, it is not intended to limit the invention and changes and modifications may be made therein within the scope of the following claims. For example, the sealing collar according to the present invention can also be used for cylindrical roller thrust bearings or conical roller thrust bearings.

What is claimed is:

1. Sealing device in combination with a thrust bearing including a pair of bearing disks having a bore and outer circumferential surfaces and facing end surfaces (30, 30a), comprising a pair of sealing collars (4, 5, 33, 34), said collars being permanently seated on one of the bearing disks and free to rotate on the other disk, said sealing collars (4, 5, 33, 34) being provided with integral sealing lips (29), which rest against said facing end surfaces (30, 30a) of said bearing disks (1, 2), aid bore and circumferential surfaces including peripheral recesses (10, 11, 17 and 18) on said bore and circumferential surfaces and having contact surfaces (12, 13, 21, 22), said sealing collars having cooperating retaining projections (8, 9, 19, 20) for contact with said contact surfaces to hold the bearing disks (1, 2) axially in place.

2. Sealing device according to one of claim 1, including at least one vent opening (31) in the sealing collars (4, 5, 33, 34).

3. Sealing device according to claim 1, characterized in that the sealing collars (4, 5, 33, 34) are provided with peripheral sealing lips (15, 15a, 24, 25), which rest against the axially oriented surfaces (16, 16a, 26, 27) of the recess (10, 11, 17, 18).

4. Sealing device according to one of claim 1, including recesses (32) on the lateral surface and in the bore of the bearing disks (1, 2), starting from their facing end surfaces (30, 30a), to hold the sealing collars (33, 34).

5. Sealing device according to claim 1, characterized in that the sealing collars (33, 3) have peripheral sealing lips (40), which rest against the radial surfaces (39) of the recesses (32).

* * * * *